Oct. 21, 1930. F. P. ZIMMERLI Re. 17,841

VISCOSIMETER

Original Filed July 30, 1923 2 Sheets-Sheet 1

Inventor:
FRANZ P. ZIMMERLI,
By John N. Bunnings
His Attorney.

Oct. 21, 1930. F. P. ZIMMERLI Re. 17,841

VISCOSIMETER

Original Filed July 30, 1923 2 Sheets-Sheet 2

Inventor:
FRANZ P. ZIMMERLI,
By John N. Bruninga
His Attorney.

Reissued Oct. 21, 1930 Re. 17,841

UNITED STATES PATENT OFFICE

FRANZ P. ZIMMERLI, OF DETROIT, MICHIGAN, ASSIGNOR TO THE AUTOMATIC APPLIANCE COMPANY, OF ST. LOUIS, MISSOURI, A CORPORATION OF MISSOURI

VISCOSIMETER

Original No. 1,557,517, dated October 13, 1925, Serial No. 654,673, filed July 30, 1923. Application for reissue filed June 10, 1929. Serial No. 369,832.

This invention relates to certain new and useful improvements in testing apparatus, and more particularly to mechanism for indicating the thickness or thinness of liquids containing matter in solution, or of solutions whose composition is free of suspended substances or whose body consists of heavy slow moving particles such as possess great viscosity.

Heretofore meters for measuring the viscosity of fluids have been what might be termed laboratory meters, that is to say, meters which give samples of the material undergoing test. The device which I have invented is what might be termed a continuous viscosimeter, that is to say, the liquid in its process of manufacture may be continuously run into my machine at one end and out at the other end during the entire run with the absolute certainty that measurement for viscosity is for the entire period.

One of the objects of this invention is to provide a viscosimeter whereby the viscosity of a fluid may be directly indicated by an indicating device.

Another object is to provide a viscosimeter of the character described whereby the viscosity of the fluid may be continuously indicated.

Another object of this invention is to provide a viscosimeter whereby a part of the fluid is passed through the device so as to indicate the viscosity of the whole.

The viscosity meter illustrated is mounted upon a board intended to be hung or otherwise suspended upon the wall, and is particularly adaptable to determining the viscosity of oils, enamels, greases, etc., and one of the objects of my invention is to provide a device in which the introduction of the liquid into the mouth thereof may be made with as little disturbance as possible. In order to accomplish this, I provide a series of baffle plates so that after the container or beaker is partially filled with the liquid to be measured or tested, the continuous flow or velocity of the input will produce no effect upon the reading of the scale.

Another object of my invention is to provide means for this thermometric reading of the viscous flow of liquids such as varnish, enamels, lubricating oils, etc., so that these may be compared with others at the same or different temperatures.

With these and other objects in view, which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings.

Similar reference characters indicate the same or corresponding parts throughout the several figures of the drawings.

Figure 1:
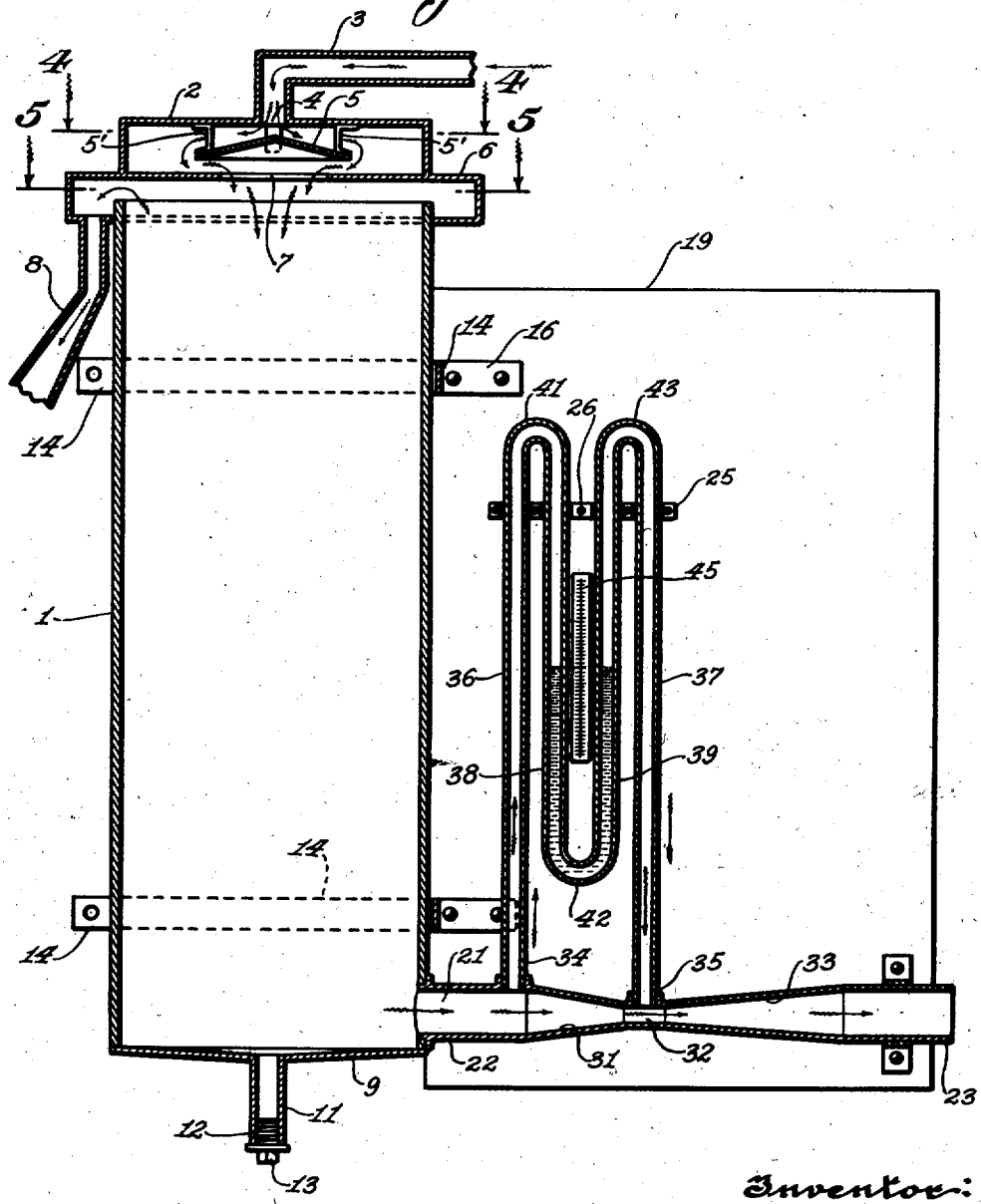
Figure 1 is a vertical sectional view of my improved device complete.

The numeral 1 indicates a container or beaker, preferably of steel or other suitable material, in the upper portion or antechamber 2 of which is inserted an inlet pipe 3 in an opening 4, through which the liquid enters said antechamber, whence it descends upon the circular baffle plate 5 attached to the lower side of said antechamber 2 by means of depending plates 5′ attached thereto. The cover 6 of the container proper is provided at its center 7 with an annular opening of a size somewhat smaller than the baffle plate 5 through which the liquid is conveyed into the container 1, and on the left hand side is provided with an overflow pipe 8 so as to hold the head of the material constant. The lower portion or bottom 9 of the container is provided with a short drain pipe 11, screw-threaded at its lower end, into which fits a correspondingly screw-threaded block 13, upon the removal of which the remaining liquid therein is emptied so that the container may be cleansed.

Figure 2:
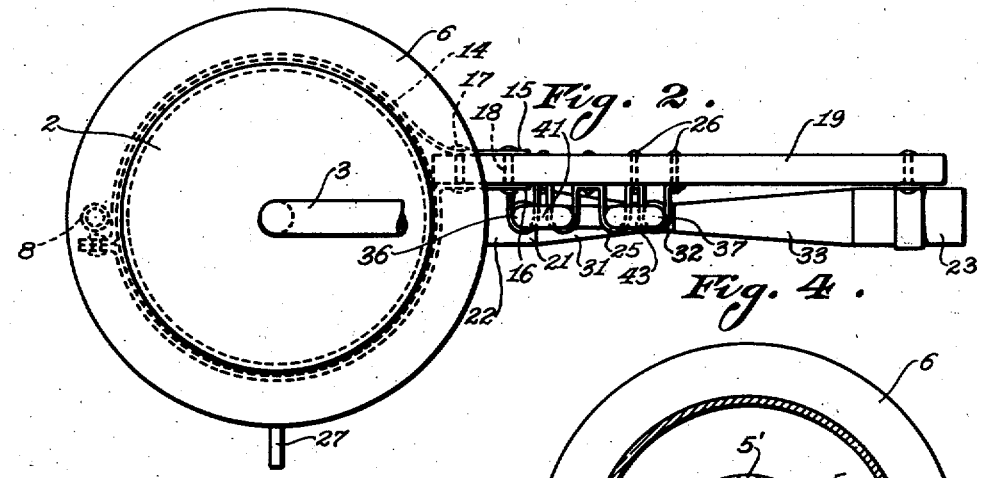
Fig. 2 is a plan view thereof.
Figure 4:
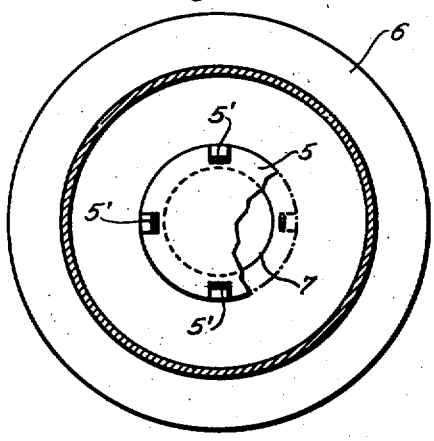
Fig. 4 is a sectional view on the line 4—4 of Fig. 1.

As clearly seen in Figures 1 and 2, the container is surrounded by semi-circular bands 14 bolted together on the far side and embracing on its near side between its ends 15 and 16, by means of bolts 17 and 18, a mounting board 19 to which the device is attached.

Figure 3:
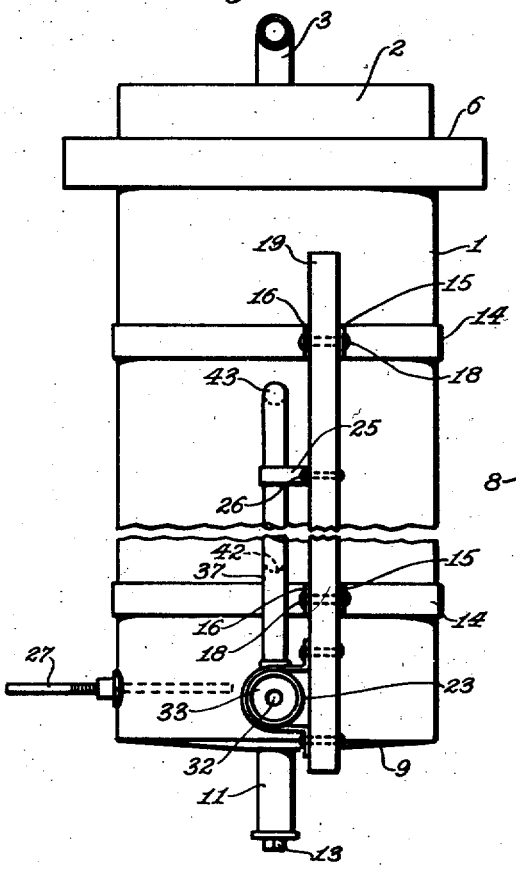
Fig. 3 is an end view looking from the right side of my device.
Figure 5:
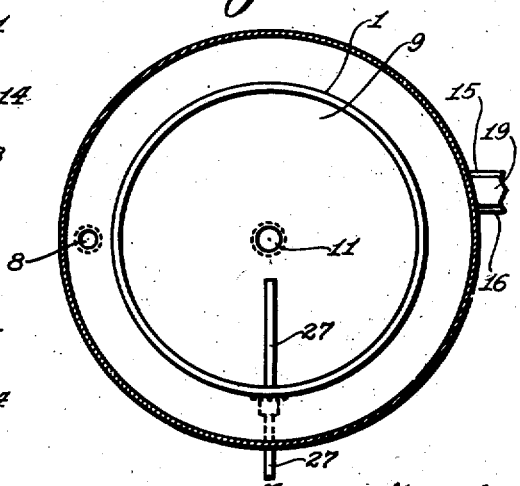
Fig. 5 is a sectional view on the line 5—5 of Fig. 1.

In filling the container with the material to be tested, it is brought into the container through the inlet pipe 3, any excess thereof discharging itself through the overflow 8, the remainder flowing through the measuring tube 21. This tube 21 is of the same size at 22 and at 23, which latter is supported by a bracket bolted to the mounting board. The measuring device or U-tube and connections, as seen in Fig. 2, are held in place upon the board by the brackets 25 and clamping bolts 26. As seen in Figures 2, 3 and 5, the device is provided with a thermometer 27, by means of which thermometric readings may be obtained when the material is heated.

The tube 21 is of the same size at 22 and 23, but the intermediate portion 31, 32, 33, as seen in Figure 1, is considerably restricted, especially at the throat 32. The outlet pipe 21 is provided on its upper side with outlets 34 and 35 into which are fitted the respective ends of a pipe having outer legs 36 and 37 and inner legs 38 and 39, with goose necks 41, 42 and 43, the whole being united into a continuous pipe, and between the inner legs is located a gauge 45 divided into desired calibrated units (such as Saybolt records for oil or MacMichael units for enamels). The whole forms a measuring device or pressure gauge, which is in this embodiment of the U-tube type.

The operation of the device is as follows: The material to be tested is fed into the inlet pipe 3 at such a rate that the container 1 is filled with a slight excess overflowing through the outlet pipe 8. The remainder of the liquid flows through the measuring pipe 21. The measuring device or U-tube is filled with water or other liquid, preferably colored, to the center of the calibrated scale to be presently described. Due to the construction of said pipe at the throat 32, a partial vacuum is formed in the outer leg or ascending tube 37, and a pressure in the outer leg or ascending tube 36 on the other side, which is communicated through the goose necks at 43 and 41, respectively, to the U-tube and the liquid therein, and the change is noted upon the calibrated scale at 45.

As thicker materials are placed in the container, the velocity through the measuring pipe is, of course, diminished with less action at the throat and less disturbance of the measuring fluid. With thinner liquids, the reverse is true. To meet this condition, should the material be very thick or very thin, measuring tubes with various sized throats may be employed, but for continuous work on definite material, such is not necessary.

Further, by providing means for ascertaining the heat of the liquid, the lubricating qualities thereof may be compared at different temperatures and also the lubricating qualities of different liquids may be compared at the same temperature.

It will be observed that since the portion 22 is unrestricted, the pressure within the left leg 36 (Figure 1) will remain definite and equal to the head of the fluid in the container 1. Where the specific gravity of the fluid remains constant, the pressure will remain constant; and with a given specific gravity the pressure will be a definite one. The fluid pressure in the leg 37 will, however, vary with the viscosity of the liquid, to a value below that in the leg 36; and this fluid pressure in the leg 37 may drop considerably below atmospheric pressure, depending upon the viscosity of the fluid and, accordingly, upon the rate at which it passes through the restriction in the pipe 21. In view of the fact that the fluid pressure in the leg 36 is definite not only is the fluid flowing through the pipe at a definite head, but as far as the gauge connection 36 is concerned, it introduces no variable, due to the fact that the pipe portion 22 is unrestricted; accordingly, the gauge connection 36 serves merely to determine the reading of the gauge when no fluid flows through the pipe 21. The variable gauge reading is introduced by the fluid pressure in the leg 37, which varies with the rate of flow through the restriction in the pipe and which rate of flow varies inversely as the viscosity of the fluid.

The pipe portions 31, 32 and 33, arranged, as they are, in series, form together a composite restriction, with the restricted portions 31 and 33 connected through the major restriction 32. The leg 37 of the gauge is tapped to the composite restriction at or near the major restriction 32 serves to transmit the pressure to the gauge; and as this gauge is calibrated to indicate a range of viscosities, it will respond to variations in the pressure due to a variation in the viscosity of the fluid. While this pressure may be below atmospheric pressure while fluid flows through the pipe 21, it does actually indicate a pressure with reference to 0 absolute.

It will be noted that, since the container 1 is provided with a by-pass 8, only a part of the fluid is supplied to the pipe 21, while the remainder flows through the by-pass; it is, therefore, not necessary that the whole body of fluid pass through the pipe 21; for the part passed therethrough is a sample of the whole body of fluid. Furthermore, the container with its by-pass provides a device for maintaining a definite pressure so as to provide means for producing a definite pressure source of fluid whose viscosity is to be determined. There is thus provided a device for continuously testing the viscosity of a fluid flowing through a conduit 3 while a part of the fluid from this conduit is supplied to the pipe 21 and its restriction 32 at a definite pressure. The container 1 with its overflow 8, therefore, provides a device which automatically maintains a definite pressure between the conduit and the pipe.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a viscosimeter, the combination with a container adapted to contain a substance of undetermined viscosity, an inlet pipe in the top thereof, baffle plates against which the incoming liquid is diverted as it enters the container, and an overflow outlet near the top of the container for the discharge of the excess or fluid undergoing test, of an outlet pipe narrowed at the throat extending laterally from the bottom of the container, a U-tube adjacent thereto, with a measuring liquid therein, means connecting the U-tube with the outlet tube, whereby a vacuum is produced in one leg of the U-tube and a pressure in the other leg thereof, and a calibrated scale for registering the differences in the levels of the measuring fluid in the respective branches of the U-tube.

2. In a viscosimeter, the combination with a container adapted to contain a fluid of undetermined viscosity, an inlet pipe, baffle plates against which the incoming fluid is diverted as it enters the container, and an overflow outlet near the top of the container for the discharge of the excess of said fluid undergoing test, of an outlet pipe narrowed at its throat extending laterally therefrom near the bottom of the container, a U-tube adjacent thereto, with a measuring liquid therein, means connecting the U-tube with the outlet pipe whereby a vacuum is produced in one leg of the U-tube and a pressure in the other leg thereof, and a calibrated scale for registering the differences in the levels of the measuring liquid in the respective branches of the U-tube.

3. In a viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe, a U-tube adjacent thereto with a measuring liquid therein, means connecting the U-tube with the outlet pipe whereby a vacuum is produced in one leg of the U-tube and a pressure in the other leg thereof, and a calibrated scale for registering differences in the levels of the measuring liquid in the pressure measuring device.

4. In a continuous viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe narrowed at its throat, a U-tube adjacent thereto with a measuring liquid therein, means connecting the U-tube with the outlet pipe whereby a vacuum is produced in one leg of the U-tube, and a pressure in the other leg thereof, and a calibrated scale for registering the differences in the levels of the measuring liquid in the respective branches of the U-tube.

5. In a viscosimeter, the combination with a container adapted to contain a fluid of undetermined viscosity, an inlet pipe, baffle plates against which the incoming fluid is diverted as it enters the container, and an overflow outlet for the discharge of the excess of said fluid undergoing test, of an outlet pipe narrowed at its throat, a U-tube adjacent thereto with a measuring liquid therein, means connecting each member of the U-tube with the outlet pipe, whereby a vacuum is produced in one leg of the U-tube and a pressure in the other leg thereof, and a scale for registering the differences in the measuring liquid in the respective branches of the U-tube.

6. In a viscosimeter, the combination with a container adapted to contain a fluid of undetermined viscosity, an inlet pipe, baffle plates against which the incoming fluid is diverted as it enters the container, an overflow outlet for the discharge of any excess of said fluid undergoing test, and a thermometer to measure the temperature of said fluid, of an outlet pipe narrowed at the throat, a U-tube adjacent thereto with a measuring liquid therein, means connecting each member of the U-tube with the outlet pipe whereby a vacuum is produced in one leg of the U-tube and a pressure in the other leg thereof, and a scale for registering the differences in the measuring liquid in the respective branches of the U-tube.

7. In a viscosimeter, the combination with a container adapted to contain a fluid of undetermined viscosity, an inlet pipe and an overflow pipe, of an outlet pipe connected with the container and having a restricted area through which the material undergoing test is required to pass, and a pressure gauge connected to the outlet pipe near the point of restricted area whereby the viscosity of the passing material is registered in desired units on the pressure gauge.

8. In a viscosimeter, the combination with a container adapted to continuously receive a fluid of undetermined viscosity, an inlet pipe adapted to continuously conduct the fluid to said container and an overflow pipe, of an outlet pipe connected with the container and having a restricted area through which the material undergoing test is required to pass, and a pressure gauge connected to the outlet pipe near the point of restricted area whereby the viscosity of the passing material is continuously registered in desired units on the pressure gauge.

9. In a viscosimeter, the combination with a container having an outlet and adapted to contain a fluid of undetermined viscosity and means for keeping the fluid issuing from the outlet of said container under a definite pressure, of an outlet pipe connected with the outlet of the container and having a restricted area through which the material undergoing test is required to pass, and a pressure gauge connected to the outlet pipe near the point of restricted area whereby the viscosity of the passing material is continuously registered in desired units on the pressure gauge.

10. In a viscosimeter, means for maintaining a definite pressure source of fluid whose viscosity is to be determined, a pipe connected with said means and having a restricted area through which the fluid under test is required to pass, and a pressure gauge connected to the pipe near the point of restricted area, whereby the viscosity of the passing material is continuously registered in desired units on the pressure gauge.

11. In a viscosimeter, means furnishing a source of fluid whose viscosity is to be determined, a pipe connected with said means and having a restricted area through which fluid under test is required to pass, means for maintaining a pressure of a certain liquid column height upon the fluid in the pipe, and a pressure gauge connected to the pipe near the point of restricted area, whereby the viscosity of the passing material is continuously registered in desired units on the pressure gauge.

12. In a viscosimeter, means for maintaining a definite pressure source of fluid whose viscosity is to be determined, a pipe connected with said source and having a restricted area through which the fluid under test is required to pass, a U-tube with a measuring liquid therein, one branch of the U-tube being connected adjacent the restricted portion and the other branch at a different position in the pipe, whereby each leg of the U-tube is subjected to different pressure, and a scale co-operating with the measuring liquid in the U-tube to give a continuous viscosity reading.

13. In a viscosimeter, means furnishing a source of fluid whose viscosity is to be determined, a pipe connected with said means and having a restricted area through which the fluid under test is required to pass, means for maintaining a pressure of a certain fluid column height upon the fluid in the pipe, a U-tube with a measuring liquid therein, one branch of the U-tube being connected adjacent the restricted portion and the other branch at a different position in the pipe, whereby each leg of the U-tube is subjected to different pressure, and a scale co-operating with the measuring liquid in the U-tube to give a continuous viscosity reading.

14. In a viscosimeter, means for maintaining a definite pressure source of fluid whose viscosity is to be determined, a pipe connected with said source and having a restricted area through which the fluid under test is required to pass, a differential pressure gauge, one side of the gauge being connected adjacent the restricted portion and the other side at a different position in the pipe, whereby the different sides of the gauge are subjected to different pressures, and a scale co-operating with the gauge to give a continuous viscosity reading.

15. In a viscosimeter, a pipe having a restriction through which fluid under test is required to pass, means for causing flow of fluid therethrough at a definite head, and a pressure gauge calibrated to indicate a range of viscosities and connected to said pipe near the restriction so as to continuously respond to variations in the viscosity of the fluid flowing through said restriction.

16. In a viscosimeter, a pipe having portions arranged in series and joined by a restriction, means for causing flow of fluid under test under a definite head through said portions and restriction, and a pressure gauge calibrated to indicate a range of viscosities and tapped to said restriction.

17. In a viscosimeter, means furnishing a source of fluid whose viscosity is to be determined, a pipe having a restriction through which a part of the fluid under test is required to pass, means for supplying such part of the fluid from said source and to said pipe at a definite head, and a pressure gauge calibrated to indicate a range of viscosities and connected to said pipe near the restriction so as to continuously respond to variations in the viscosity of the fluid flowing through said restriction.

18. In a viscosimeter, means furnishing a source of fluid whose viscosity is to be determined, a pipe having a restriction through which fluid under test is required to pass, a device for maintaining a definite pressure, said device being connected for supplying fluid from said source and to said pipe, and a pressure gauge calibrated to indicate a range of viscosities and connected to said pipe near the restriction so as to continuously respond to variations in the viscosity of the fluid.

19. In a viscosimeter, a pipe having a restriction through which fluid under test is required to pass, a device for maintaining a definite pressure having a bypass and connected to supply fluid to said pipe at a definite head, and a pressure gauge calibrated to indicate a range of viscosities and connected to said pipe near the restriction so as to continuously respond to variations in the viscosity of the fluid flowing through said restriction.

20. In a viscosimeter, a container to which fluid under test is supplied, a pipe leading from said container and having a restriction, means for causing fluid to be supplied from said container to said pipe under a definite pressure, and a pressure gauge calibrated to indicate a range of viscosities and connected to said pipe near the restriction.

21. In a viscosimeter, a pipe having a restriction through which fluid under test is required to pass, means for causing flow of fluid therethrough at a definite head, a pressure gauge calibrated to indicate a range of viscosities and connected to said pipe near the restriction so as to continuously respond to variations in the viscosity of the fluid flowing through said restriction, and means for indicating the temperature of the fluid.

22. In a device for continuously testing the viscosity of a flowing fluid, a conduit through which the fluid flows, a pipe having a restriction through which fluid under test is required to pass, means for supplying the fluid from said conduit to said pipe at a definite pressure, and an indicating pressure gauge connected to said pipe near the restriction adapted to continuously respond to variations in the viscosity of the fluid flowing through said restrictions.

23. In a device for continuously testing the viscosity of a flowing fluid, a conduit through which the fluid continuously flows, a pipe having a restriction through which a part of the fluid under test is required to pass, means for continuously supplying a part of the fluid from said conduit to said pipe at a definite pressure, said means having a bypass for the remainder of the fluid, and an indicating pressure gauge connected to said pipe near the restriction adapted to continuously respond to variations in the viscosity of the fluid flowing through said restriction.

24. In a device for continuously testing the viscosity of a flowing fluid, a conduit through which the fluid flows, a pipe having a restriction through which fluid under test is required to pass, a device between said conduit and said pipe and adapted to maintain a definite pressure on the fluid in said pipe, and an indicating pressure gauge connected to said pipe near the restriction adapted to continuously respond to variations in the viscosity of the fluid.

In testimony whereof I affix my signature this 4th day of December, 1928.

FRANZ P. ZIMMERLI.